United States Patent [19]

Hamilton et al.

[11] Patent Number: 5,319,031
[45] Date of Patent: Jun. 7, 1994

[54] SEGMENTED IONOMERIC COPOLYMER

[75] Inventors: Raymond G. Hamilton, Bensalem; Mark T. McCarty, Levittown, both of Pa.

[73] Assignee: Rohm and Haas Company, Philadelphia, Pa.

[21] Appl. No.: 950,612

[22] Filed: Sep. 24, 1992

[51] Int. Cl.⁵ .................. C08F 255/02; C08F 255/08; C08L 51/06
[52] U.S. Cl. ..................... 525/301; 525/80; 525/309
[58] Field of Search ........................ 525/301, 309, 80

[56] References Cited

U.S. PATENT DOCUMENTS 4,957,974  9/1990  Ilenda et al. .................. 525/301

FOREIGN PATENT DOCUMENTS 826440  9/1982  South Africa.

Primary Examiner—Vasu S. Jagannathan
Attorney, Agent, or Firm—Darryl P. Frickey; Roger K. Graham

[57] ABSTRACT

A segmented ionomeric copolymer when blended with a polyolefin improves sag resistance.

7 Claims, No Drawings

SEGMENTED IONOMERIC COPOLYMER

FIELD OF THE INVENTION

This invention relates broadly to an ionomeric forming additive for use with a segmented ionomeric copolymer capable of imparting to a polyolefin, when blended therewith, high resistance to sagging without increasing melt viscosity.

More particularly, the invention relates to a polymerized olefin having grafted thereto, by covalent bonding, a polymeric vinyl monomer chain having weight average molecular weight ($M_w$) of at least 1,000 and advantageously between about 30,000 and 150,000, the chain containing copolymerized acid groups, the graft copolymer being further combined with an ionic additive.

BACKGROUND OF THE INVENTION

In U.S. Pat. No. 4,957,974 there is disclosed and taught graft copolymers and blends thereof with polyolefins. The present invention is an improvement on the invention claimed in U.S. Pat. No. 4,957,974.

U.S. Pat. No. 4,957,974 describes a copolymer imparting to a polyolefin when blended therewith a high tensile modulus and high sag resistance without increasing the melt viscosity. The ionomeric copolymer comprises a polypropylene trunk with an ionomer copolymer grafted thereto. Additional patents are discussed in U.S. Pat. No. 4,957,974 specification. The specification of U.S. Pat. No. 4,957,974 is incorporated by reference herein.

DESCRIPTION OF RELATED ART

South African Patent No. 826,440 describes "improved melt viscosity" (higher melt viscosity under low shear conditions while retaining the low melt viscosity at high shear rheology behavior of the unmodified polypropylene) and improved thermoforming characteristics for blends of polypropylene with certain salts of acid-modified propylene polymers.

Thus, the art has described means for preparing grafts of methyl methacrylate homo- and copolymers upon polyolefin substrates, and recognized the advantages of the polymerization process described in U.S. Pat. No. 4,957,974 production of the grafts. The art teaches that certain of these grafts may be blended with polyolefins as having positive effects on both low-shear melt and solid-state properties.

It is one object of this invention to improve upon the novel graft polymers of methacrylic esters onto polyolefin substrates provided for in U.S. Pat. No. 4,957,974. Another object is that an acidic monomer be used in the monomer mixture used to make the graft copolymer. It is still a further object of this invention to improve the sag slope or the resistance to sag upon thermoforming of a blend especially with a polyolefin with the addition of an ionomer forming additive, in the ionomer generated from the acid monomer in the segmented ionomeric copolymer and the additive.

Further objects and advantages of this invention will appear as this specification progresses.

SUMMARY OF THE INVENTION

Broadly the objects and advantages are accomplished by grafting a copolymer or terpolymer onto a non-polar polyolefin trunk in solution as taught in U.S. Pat. No. 4,957,974.

The grafted product is a segmented copolymer. By "segmented" we mean that the copolymer can be a graft copolymer or a block copolymer or a combination of a graft copolymer and a block copolymer.

The term "ionomer" or "ionomeric" as used herein means a copolymer containing mers which have groups bearing positive or negative charge, the charged groups being associated with non-polymeric counter ions. The term "mer" or "mers" as herein means a combination of elements which when polymerized form a single repeating unit in a polymer. Thus the monomer ethylene ($C_2H_4$) or $CH_2=CH_2$, becomes the mer ethylene ($-CH_2-CH_2$), in polyethylene even though the ethylenic double bond is no longer present in the polymer or copolymer.

In one method of manufacturing, when a segmented ionomeric copolymer is prepared from a polyolefin in solution (for example in t-butyl benzene), the vinyl monomers are added to the polyolefin together with an initiator which generates a constant low radical concentration, or radical "flux", at the solution temperature. These radicals initiate polymerization of the monomer and cause formation of a covalent bond with the trunk. At least one is a copolymer which may have a weight average molecular weight from about 1000 to greater than about 20,000, and present in a weight ratio with the polyolefin of from about 1:9 to 4:1. The segmented copolymer is derived from at least about 30%, preferably at least 80%, of a monomer of a methacrylic ester of the formula $CH_2=C(CH_3)COOR$, where R may be alkyl, aryl, substituted or unsubstituted, and/or a vinyl aromatic monomer copolymerizable with the methacrylic ester and based on the total monomer weight, of at least 1 weight % of an copolymerizable acidic monomer therewith. Preferably the segmented copolymer is derived from about 85% of a monomer of a methacrylic ester. When the segmented copolymer is comprised of a vinyl aromatic monomer, then this monomer is present at about 50% and preferably 75% of the total monomer quantity. Yet more preferably the monomer will be about 95% of a methacrylic ester.

The amount of acid monomer should be at least 1 weight % and can be up to about 20 weight % of the polyolefin used in making the segmented copolymer. Preferably the amount of acidic monomer will be at least 5 weight % up to about 15 weight %. Above about 20 weight % monomer the segmented copolymer concentrate does not show any additional improvement in the sag slope data. The most preferred acid monomer is methacrylic acid at about 5 weight % of the polyolefin.

When the copolymer is made from an acid containing monomer such as methacrylic acid, (MAA) the ionomer forming additive may be trivalent, divalent or monovalent salts.

The acidic monomer may be selected from methacrylic acid, acrylic acid, ethacrylic acid, butacrylic acid, propacrylic acid o, m, or/and p vinyl aromatic acid and mixtures thereof or salts of these acids. The monomers are added to the polyolefin together with an initiator which generates a constant, low radical concentration, or radical "flux", at the solution temperature. These radicals initiate polymerization of the monomer and cause formation of a covalent bond with the trunk.

The resulting segmented copolymer (which includes homopolymers) may be blended with polyolefin either as a result of the manner by which it is made, or after it is made. It may be extruded into a desired shape either directly, or after pelletization. In either case, the resulting blended product exhibits high sag resistance without an increase in melt viscosity, as compared with similar ungrafted polymers, viz: polyolefins without a high molecular weight chain or chains covalently bonded thereto.

Briefly, one of the processes according to this invention involves dissolving the polyolefin in an inert hydrocarbon solvent, and heating to dissolve the polyolefin, i.e. at least about 140° C. While agitating the solution, a monomer mixture including, the acidic monomer, for example the acrylic acid (AA) or methacrylic acid (MAA) monomer, is introduced, together with an initiator which generates a constant, low radical flux at the temperature of the solution; the radicals initiate polymerization of the MAA monomer and formation of a covalent bond therewith on the polyolefin trunk. After the grafting reaction has been completed the ionomer forming additive salt may be added to the mixture. The reacted mixture may be allowed to solidify by removal of the solvent. The resultant product, the concentrate, consists of the polyolefin with the segmented copolymer chain grafted thereto, unreacted polymer, i.e. polyolefin without the chain, and ungrafted methacrylic ester polymer. It may be pelletized, blended with another polyolefin and extruded into desired shape. Alternatively the reaction mixture may be extruded directly in a devolatilizing extruder to volatize the solvent and residual monomers, and thereafter blended with a polyolefin and extruded to form article in such form as sheets, tubes and the like.

DETAILED DESCRIPTION

The term "polar substrate" or "non-polar" polymer, as used herein, is difficult to define in quantitative terms. By "non-polar" is meant polymers which are predominantly formed from monomer units of mono- or di-olefins. "Polar", as generally understood in the polymer art, would refer to monomers or polymers which contain an oxygen, nitrogen, or sulfur-containing functionality. Thus, methyl methacrylate, acrylonitrile, and vinyl phenyl sulfone are "polar" monomers, whereas polypropylene is a "non-polar" polymer.

The polymers to be modified in the process include the non-polar olefin polymers and copolymers. Included are polypropylene, polyethylene (HDPE, LDPE, and LLDPE), polybutylene, ethylene-propylene copolymers at all ratios of ethylene and propylene, EPDM terpolymers at all ratios of ethylene and propylene and with diene monomer contents up to 10%, poly(1-butene), polymethylpentene, ethylene-vinyl acetate copolymers with vinyl acetate contents up to 25%, ethylene-methyl acrylate copolymers, ethylene-methyl methacrylate copolymers, and ethylene-ethyl acrylate copolymers. Also included are mixtures of these polymers in all ratios.

The molecular weight of the polyolefin polymer which forms a part of the segmented copolymer will be at least about 1000 and may be from a $M_w$ of about 20,000 to about 1,000,000. The polyolefin segment having the lower molecular weights, especially those with a weight-average molecular weight below about 100,000 are more used to improve melt rheology of higher-molecular-weight polyolefins, as for example those having weight-average molecular weights above about 300,000. The segmented copolymer is derived from about 80% or more of a monomer of a methacrylic ester of the formula $CH_2=C(CH_3)COOR$ where R may be alkyl, aryl, substituted or unsubstituted and/or a vinyl aromatic monomer copolymerizable with the methacrylic ester and based on the total monomer weight. The acidic monomer should be from about at least 1 weight % up to not more than about 20 weight % of the polyolefin. Preferably 5 weight % up to about 15 weight %. The acidic monomer may be selected from methacrylic acid, acrylic acid, ethacrylic acid, butacrylic acid, propacrylic acid, o, m, and/or p vinyl aromatic acid and mixtures thereof. Ethacrylic acid, butacrylic acid and propacrylic acid are known by the formula, $CH_2=CR^1-COOH$ wherein $R^1$ is ethyl, butyl and propyl, respectively. The preferred acid monomer is methacrylic acid in the range of about 5 weight % up to 15 weight % the polyolefin.

The monomer mixture is added to the polyolefin together with an initiator which generates a constant, low radical concentration, or radical "flux", at the solution temperature. These radicals initiate polymerization of the monomer and cause formation of a covalent bond with the trunk.

Melt flow rate (mfr) is well known to correlate well with weight-average molecular weight. The lower the mfr number the higher the molecular weight. The preferred range of mfr values for the polyolefin segments used in preparing the block copolymers of the present invention are from about 20 to about 0.6 g/10 minutes as measured by ASTM Standard Method D-1238.

The average weight average molecular weight of the acrylic portion of the segmented copolymer may be from about 1000 but preferably about 20,000 to 200,000. The preferred range is 30,000 to 150,000. The molecular weight of the acrylic portion of the block copolymer may be determined by polymerizing the acrylic portion in the absence of a polyolefin, but under the same reaction conditions as are used in preparing the copolymer. Thereafter, the weight average molecular weight of the acrylic homopolymer is determined using known gel permeation chromatography procedures.

The segmented ionomeric copolymer is prepared by one of several methods. An olefin monomer is polymerized to give a pre-polymer which has active sites. The polymer is reacted with an acrylate monomer. The polymer acts as the initiator for the reaction. In this manner a segmented copolymer is obtained. Alternatively, a segmented copolymer may be obtained by polymerizing a diene in the presence of an anionic initiator to obtain a polymer. Thereafter, the acrylate monomer is then polymerized in the presence of the polymer and the resultant segmented copolymer is then hydrogenated.

The process may be conducted in a solvent which dissolves the non-polar polymer. The solvent is also one that has no or low chain transfer ability. Examples include non-branched and branched aliphatic hydrocarbons, chlorobenzene, benzene, t-butylbenzene, anisole, cyclohexane, naphthas, tetrahydrofurans, toluene, xylene and dibutyl ether. Preferably, the solvent is easy to remove by devolatilization, and therefore has a boiling point below 200° C., preferably below about 150° C. To avoid excessive pressure, a boiling point above about 100° C. is also preferred. The final solids content depends on the viscosity and the ability to mix well. The practical limits are 20% to 70% but the solids content can be as high as is consistent with good mixing for economic reasons. Preferably, the solids content falls in the range of about 35% to about 60%.

The temperature during the polymerization can be in the range 110° to 200° C. but the preferred range is 130° to 175° C. Especially preferred is 145° to 160° C. The pressure can be atmospheric to super atmospheric, or as high as 2100 kPa or whatever is necessary to keep the reaction mixture in the liquid phase at the polymerization temperature.

The unreacted monomer concentration should be kept low during the reaction. This is controlled by balancing the radical flux and the monomer feed conditions.

For polymerization, oil-soluble thermal free-radical initiators are used. Those that work in this process are those with a one hour half life at about 60° to about 200° C. Suitable free radical initiators include peroxy initiators such as t-butyl peroxypivalate, lauroyl peroxide, 1,1,3,3-tetramethylbutyl peroxy-2-ethyl hexanoate and others.

The initiator is introduced together with the monomer mixture during the polymerization in a manner to maintain a fairly constant radical flux during most of the polymerization. This is done to achieve a desired molecular weight, a high graft efficiency, the desired molecular weight distribution, and freedom from gel.

The process may be run in a semi-continuous or continuous manner. Monomer mixture, solvent, and initiator may be added by any known means. Polymer may be separately dissolved in solvent and added at a rate essentially equivalent to that of product removal, or polymer may be melted and added as a solid to the reaction by means of an extruder.

After the polymerization, a hold time may be used. Then the mixture is devolatilized to remove solvent and any unreacted monomer. Acceptable devolatilizing devices include a devolatilizing extruder, a rotary film evaporator, or any other convenient stripping device as known in the art. The polymerization reaction mixture may be conveyed to the devolatilization apparatus as a batch or continuously. Prior to, during, or after the devolatilization step, appropriate ionomeric forming additives may be added, such as the calcium or magnesium salt when an acidic monomer is used.

In another application U.S. Ser. No. 747,555, filed Aug. 20, 1991, we describe a process for polymer blends where solid polyolefin beads are reacted with a vinyl aromatic monomer including an acidic monomer copolymerizable with the vinyl aromatic monomer. In Ser. No. 747,555 a polyolefin is blended with (a) from about 0.1 to about 50% and preferably from 0.1 to about 10% of a segmented copolymer of a non-polar polyolefin for example a polymer or copolymer of polyethylene, polypropylene, polybutylene, poly(4-methylpentene), covalently bonded to a polymer derived from above 20 to about 100% and, preferably, from about 40 to about 100% of a vinyl aromatic monomer such a styrene, methylstyrene, dimethylstyrene, ethylstyrene, isopropylstyrene, dichlorostyrene, α-methylstyrene, α-ethylstyrene and the like and from about 0 to 80% and preferably from about 0 to about 60%, based on the total monomer weight, of one or more monomers copolymerizable with the vinyl aromatic monomer such as other vinyl aromatic monomers as defined above and 4-methylstyrene, substituted and unsubstituted acrylates and methylstyrene, substituted and unsubstituted acrylates and methacrylates, acrylic acids, methacrylic acids and anhydrides such as maleic anhydride and the like. The copolymerizable monomer may also be a crosslinker containing at least two vinyl groups such as divinyl benzene or glycol dimethlacrylate and the like.

Styrene is the most preferred vinyl aromatic monomer to form the ionomeric segmented copolymer.

If such ionomer forming additives do not affect the grafting reaction, they may be added prior to, during, or after the polymerization process. Other ionomeric forming additives may also be added when the copolymer is blended with the matrix polyolefin polymer. Additives may include stabilizers against light or heat, such as benzotriazoles, hindered amines, alkyl polysulfides such as dialkyl disulfides, and the like, lubricants, or plasticizers; flame retardants; and the like. Preferred is the addition of a disulfide, such as di-n-dodecyl disulfide or di-t-dodecyl disulfide and the like at levels between about 0.001% to about 0.05% by weight of segmented copolymer, based on the weight of segmented copolymer plus matrix polymer, to stabilize the acrylic portion of the copolymer against thermal degradation during melt processing while admixing into the matrix or blending and extruding.

The product is then isolated by stranding, cooling, chopping, drying, and bagging, or other known collection techniques.

The polyolefin and the segmented ionomeric copolymer concentrate may be blended by mixing the dry feed materials and extruding either directly to form a film, sheet or the like, or by collecting the blend and reprocessing it into the desired article, or by adding the polyolefin in the course of the devolatilization.

Polyolefins are often produced with one or more stabilizers to prevent degradation of the polymer appearance or physical properties during processing and/or end use. Such stabilizers may include metal salts such as metal stearates, which act as acid acceptors, hindered phenols, which act as anti-oxidants, and sulfur-containing organic esters or derivatives, added as heat stabilizers. Examples of such additives, which are usually proprietary to the supplier, are metal stearates, 2,6-dimethylphenolic compounds, and thiodiesters of long-chain alcohols. Polyolefins may also contain light stabilizers, such as hindered amines, benzotriazoles, and the like. All of the polyolefins used in the present examples are thought to contain small amounts of these proprietary stabilizers.

One way to specify the blend composition is that at least about 0.2% of the total formulation (polyolefin plus segmented ionomeric copolymer) should be a chemically grafted acrylic ionomeric polymer or copolymer within the molecular weight limits specified. The maximum amount is about 10% grafted segmented acrylic polymer, with up to about 5% grafted acrylic polymer being preferred for cost optimization and optimization of most properties of the blend.

Optionally, the blend of concentrate and polyolefin may be further modified by the introduction of fillers, both inorganic and organic, fibers, impact modifiers, colorants, stabilizers, flame retardants, and/or blowing agents.

Blowing agents may be gases, such as nitrogen or carbon dioxide, admixed with the polymer melt in the extruder and allowed to expand upon extrusion. More often, blowing agents are solids which liberate gases, usually nitrogen, at a specific melt temperature, and which are mixed into the melt, or blended from a pre-compounded mixture of the blowing agent dispersed in a polymeric matrix. The melt temperatures for the polyolefins are typically in the range of about 200 to about 230° C., although other temperatures may be used, depending on the specific blowing agent. Solid blowing agents include azo compounds such as azodicarbonamides, azoisobutyronitriles, hydroazo compounds, or compounds containing the nitroso group.

The blend of the segmented ionomeric copolymer, the ionomer additive and polyolefin is useful in thermoforming, film making (especially blowing and extruding), blow molding, fiber spinning, acid and basic dyeing, foaming, extrusion (sheet, pipe, and profile), coextrusion (multilayer film, sheet, preforms, and parisons, with or without the use of tie layers), hot melt adhesives, calendering, and extrusion coating (for the preparation of polymer/fabric, carpet, foil, and other multilayer constructions).

The segmented ionomeric copolymers of the present invention are useful in preparing polyolefin fibers, especially polypropylene fibers; they are especially useful when the segmented graft copolymer is formed from a polypropylene trunk. Polypropylene is relatively easy to process into fibers having high strength and toughness.

Polypropylene fibers show certain deficiencies which include difficulty in dyeing and poor long-term dimensional stability. Functional sites capable of accepting dye may be prepared by the present process by incorporating low levels of dye-accepting monomers, such as dimethylaminoethyl methacrylate, N-vinylpyridine, and the like. The improved sag resistance noted for the ionomeric coolymers in a polypropylene matrix should correspond to improvements in creep resistance of the fiber.

Polypropylene may be formed into fibers by slitting tape from extruded film to form large-denier, coarse fibers, by extruding monofilaments into large-denier fibers with a controlled cross-sectional size, or by extruding multifilaments through a spinnerette to produce bundles of small-denier fibers.

Polypropylene fibers may be used for, among other things, strapping, netting (including fish nets), slit tape, rope, twine, bags, carpet backing, foamed ribbon, upholstery, rugs, pond liners, awnings, swimming-pool covers, tarpaulins, lawn-furniture webbing, shades, bristles, sutures, nonwoven fabrics, such as for tea bags, bed sheets, bandages, diaper liners and the like, and for doll hair, apparel and the like.

In the examples which follow, polymer concentrates and polymer blends were tested using standard procedures which are summarized below.

The polypropylene concentrate including the ionomer forming additive (i.e., the calcium or magnesium salts) and other additives were blended in the melt on a 7.6 cm by 17.8 cm electric mill with a minimum gap of 3.8 mm set at 190° C. Once the material had fluxed, it was mixed an additional 3 minutes. Higher temperatures were used for higher viscosity materials (for example, mfr=0.5-2 material was done at 195°-210° C.). While still hot, the material was either compression molded or cut into small chunks (about 1-2 cm in each dimension) for granulation (5 mm screen). It is of interest that the additives of the present invention contribute to easy release from hot metal surfaces, such as mill rolls, Haake Rheocord bowls, etc.

A 2.5 cm Killion extruder was used for extrusion blending. A two stage screw was used at 150 rpm, with all three zones set for 190° C. The one-strand die was also set at the same temperature. A vacuum vent was used. The strand was cooled in water and pelletized. The extrusion rate was 4.5 kg per hour.

Melt blending in a Haake Rheocord (a batch melt mixer) was done on 50 g samples at 190° C. or at 210° C. and 100 rpm in air. Mixing was continued for three minutes after peak torque was reached. Sample size was 50 grams.

The polyolefin blends were compression molded in an electrically heated Carver press 15×15 cm or Farrel press 30.5×30.5 cm. The samples were molded between aluminum plates with an appropriate spacer to provide the required thickness 0.25-3.8 mm. In one method the hot melt was taken directly from the mill roll and placed between two aluminum sheets. This was then placed in the press set at 190° C. and pressed at high pressure (68-91 metric tons for the Farrel press and 6820 kg for the Carver press). After three minutes the mold was placed in an unheated press at high pressure for three minutes. In the other procedure, granulated material or pellets produced from an extrusion, Haake, or milling operation were dried and then compression molded. The procedure used was the same as for molding a melt except that a 5 minute preheat was used while maintaining a slight pressure on the press. This was followed by the high pressure molding in the hot and cold presses. A hot press of 190° C. was usually sufficient for mfr=4 polypropylenes, but higher viscosity polypropylenes would split during sag testing unless higher molding temperatures were used (195°-210° C.).

The sag tests are performed on a compression molded sheet 10×10×0.15 cm. This sheet was clamped in a frame with a 7.6-cm-square opening. There were metal rulers attached to the front and back of the frame for use in measuring the amount of sag. The frame and sheet were placed in a hot, forced air oven (typically at 190° C.). The amount of sag of the center of the sheet was then recorded as a function of time. Typically, the sag was first recorded at 2.5 cm but for slow sagging materials sags as low as 16 mm were recorded. Data was recorded up to 10.2 cm of sag or for 30 minutes, whichever occurred first.

The term "slope" refers to the slope of a plot of the natural logarithm of the sag in centimeters versus time, resulting in a straight line. A high slope indicates that the material sags quickly while a low slope indicates that it sags slowly. The sag slope of polypropylene without any additive, for example, is 0.21. The advantage of comparing slopes in this manner is that it eliminates any differences in oven cooling when the sample is introduced (due to differences in the time the oven is open, room temperatures, etc.).

Crude thermoforming was done in the laboratory to illustrate this melt strength effect. A sheet of polypropylene or modified polypropylene was heated in a forced air oven at 190° C., removed from the oven, placed over a female mold, and subjected to vacuum.

The examples are intended to illustrate the present invention and not to limit it except as it is limited by the claims. All percentages are by weight unless otherwise specified and all reagents are of good commercial quality unless otherwise specified.

EXAMPLES OF TABLES 1, 2 AND 3

Examples A and B in Tables 1 and 2 illustrate the preparation of a segmented graft ionomeric copolymers. The monomer composition, 89% MMA, 5.6% BA and 5.4% MAA, is polymerized in the presence of polypropylene at atmospheric pressure in t-butylbenzene solvent. Two batches of the same compositions were made, Example A and Example B, to establish the generality of the effect.

To test the effect on the sag tests 2 weight percent of each segmented ionomeric copolymer concentrate (based on 100 parts by weight of polypropylene); 0.5 or 1.0% weight of the ionomer forming additive were blended together and tested. Table I indicates that ionomer forming additive (the acetate salts of magnesium and calcium) improves the sag slope of the segmented ionomeric copolymers prepared from monomer mixtures containing an acid monomer in the mixture.

In this example the following abbreviations will be used.
AA: acrylic acid
BA: butyl acrylate
MAA: methacrylic acid
MMA: methyl methacrylate
PP: polypropylene (polyolefin).

the reactants to react in the extruder, venting off the unreacted polyacrylic acid monomer and other volatiles before pelletizing the resulting POLYBOND ® product.

Comparative Example E represents a segmented ionomeric copolymer prepared from a monomer mixture containing 95 weight % MMA and 5 weight % BA. No acidic monomer was included in the monomer mixture.

Table I shows with segmented copolymers, Examples A and B, that the ionomer forming additive (i.e., calcium and magnesium salt) provides additional sag slope resistance when blended into the polypropylene matrix polymer. When the same calcium and magnesium salts are put in the comparative examples C, D and E, the sag resistance does not improve.

With the addition of a preferred ionomeric additive i.e., calcium acetate to the commercial Polybond ® Examples C and D no improvement in sag slope is observed.

TABLE 1

| Example | Segmented Copolymer (Weight Ratio) (Nominal Composition) | | | | Ionomer Additive | Sag Slope (2%) |
|---|---|---|---|---|---|---|
| | PP: | MMA: | BA: | MAA | | |
| A | 75: | 101: | 6.4: | 6.1 | None | 0.09(Av. of 5) |
| A | 75: | 101: | 6.4: | 6.1 | Ca(OAc)$_2$ (0.5%) | 0.03(Av. of 5) |
| A | 75: | 101: | 6.4: | 6.1 | Mg(OAc)$_2$ (0.5%) | 0.03 |
| A | 75: | 101: | 6.4: | 6.1 | Mg(OAc)$_2$ (0.5%) | 0.04 |
| A | 75: | 101: | 6.4: | 6.1 | CaCO$_3$ (1.0%) | 0.10 |
| A | 75: | 101: | 6.4: | 6.1 | CaCO$_3$ (0.5%) | 0.09 |
| A | 75: | 101: | 6.4: | 6.1 | Na(OAc) (0.5%) | 0.07 |
| B | 75: | 101: | 6.4: | 6.1 | None | 0.09(Av. of 2) |
| B | 75: | 101: | 6.4: | 6.1 | Ca(OAc)$_2$ (0.5%) | 0.025(Av. of 3) |
| C[1] Polybond ® (MFR 12) | | | | | Ca(OAc)$_2$ (1.0%) | 0.19 |
| C[1] Polybond ® (MFR 12) | | | | | None | 0.19(Av. of 2) |
| D[1] Polybond ® (MFR 10) | | | | | Ca(OAc)$_2$ (1.0%) | 0.21(Av. of 3) |
| D[1] Polybond ® (MFR 10) | | | | | None | 0.21(Av. of 2) |
| E[2] | 75: | 107: | 6.4: | 0 | Mg(OAc) (0.5% | 0.16 |
| E[2] | 75: | 107: | 6.4: | 0 | None | 0.14 |
| F Polypropylene (MFR 4) | | | | | None | 0.21 |

[1]POLYBOND ® - commercial available chemically modified polypropylene
[2]Comparative Example without Acid Monomer Component The calcium or magnesium salts were simply added directly to the example A and B segmented copolymers and the milling then completed in the normal manner. The ionomers formed when magnesium or calcium acetate was used as the additive are believed to be responsible for a reduction in sag of about 6 sag slope units or alternatively the time to sag ¼" was increased from about 3 minutes to over 7 minutes. Addition of either of these salts as an additive to a control Example E (0% MAA) had no favorable affect on the sag slope.

In one Example, 2 weight % of segmented copolymer of Example A was blended with 0.5% by weight of a sodium acetate salt and with polypropylene. As the example indicates, monovalent sodium ion also apparently decreased the sag of Example A segmented copolymer but to a smaller extent.

Comparative Examples C and D represent chemically modified polypropylene and is a commercially available product line called POLYBOND ®. The product is believed to be a polypropylene to which is grafted a polyacrylic acid. POLYBOND ® product is believed to be prepared by extruding polyolefin, injecting a suitable peroxide initiator and the polyacrylic acid monomer midstream into the polyolefin melt, allowing In order to learn more about the mode of action of this material a portion was Soxhlet extracted to remove most of the nongrafted acrylic polymer. The sags of the extracted Example A (1.25% in polypropylene) in the presence and absence of the calcium salt are shown in Table 2. The sag improvement due to the salt addition still persists in the extracted material: extracted Example A without the added salt sags from 1" to 1.25" in about 5 minutes in a 190° C. oven whereas upon addition of 0.3% of the ionomer forming additive it takes about 14 minutes (see Table 2).

TABLE 2

| | Additive | Sag Slope |
|---|---|---|
| Extracted Example A | None | 0.04 (Av. of 2) |
| Extracted Example A | Ca(OAc)$_2$ (0.3%) | 0.01 (Av. of 2) |

EXAMPLES OF TABLE 3

The examples of Table 3 use a monomer composition of styrene (STY) with acrylic acid (AA) or methacrylic acid (MAA) to prepare the segmented ionomeric copolymer. The segmented ionomeric copolymer in the examples presented in Table 3 is a polyolefin trunk to which is bonded segmented ionomeric copolymers of polystyrene and acrylic acid or methacrylic acid.

TABLE 3

| Example | Segmented Copolymer Weight Ratio Nominal Composition | | | | Ionomer Additive | Sag Slope (2%) | Sag Slope (1%) |
|---|---|---|---|---|---|---|---|
| | PP: | Sty: | AA: | MAA | | | |
| G[2] | 175: | 30: | 7.5 | | None | 0.04 | 0.09 |
| G | 175: | 30: | 7.5 | | Ca(OAc)$_2$ (0.5%) | 0.01 | 0.08 |
| H[2] | 175: | 30: | 10 | | None | 0.04 | 0.07 |
| H | 175: | 30: | 10 | | Ca(OAc)$_2$ (0.5%) | 0.02 | 0.06 |
| J[2] | 175: | 30 | 15 | | None | 0.02 | 0.12 |
| J | 175: | 30: | 15 | | Ca(OAc)$_2$ (0.5%) | 0.01 | 0.06 |
| K[2] | 175: | 30: | | 10 | None | 0.03 | 0.08 |
| K | 175: | 30: | | 10 | Ca(OAc)$_2$ (0.5%) | 0.03 | 0.06 |

[2]comparative examples without ionomer additive

Polystyrene/polypropylene segmented ionomeric copolymers also show an increase in melt strength (as represented by the sag slope value; increase in melt strength corresponds to a decrease in sag slope) if an acidic monomer (MAA or AA for example) is incorporated into the polystyrene and a ionomer additive salt is added. This effect is illustrated in Table 3.

The Table 3 segmented ionomeric copolymers were all prepared by impregnating the polypropylene with the monomer mixture and an initiator; raising the temperature to decompose the initiator and effect grafting and polymerization of the monomer mixture. The process is more fully described in U.S. application Ser. No. 747,555, filed on Aug. 20, 1991.

While the invention has been described with reference to specific examples and applications, other modifications and uses for the invention will be apparent to those skilled in the art without departing from the spirit and scope of the invention defined in the appended claims.

We claim:

1. A segmented ionomeric copolymer capable of imparting to a polyolefin when blended therewith a high resistance to sagging without increasing melt viscosity, the copolymer comprising:
   (a) a non-polar polyolefin trunk selected from polyethylene, polypropylene, polybutylene, poly(4-methylpentene), copolymers of the polyolefins with each other, and one or more copolymers of the polyolefins with minor amounts of 1-alkenes, vinyl esters, vinyl chloride, (meth)acrylic ester, and (meth)acrylic acid;
   (b) at least one methacrylate chain grafted with a covalent bond to trunk having a weight ratio with the trunk of from about 1:9 to about 4:1, the chain being a polymer derived from about at least 80% of a monomer of a methacrylic ester of the formula; $CH=C(CH_3)COOR$, where R is alkyl, substituted alkyl, aryl, or substituted aryl, and further containing from about 1% up to about 20 weight % of an acidic monomer, the methacrylate chain having a molecular weight of from about 1000 to 200,000; and
   (c) an ionomer forming additive.

2. The segmented ionomeric copolymer of claim 1 wherein acidic monomer is selected from methacrylic acid, acrylic acid, $CH_2=CR^1-COOH$ wherein $R^1$ is ethyl, butyl or propyl, o, m, or p vinyl aromatic acid, or mixtures thereof.

3. The segmented ionomeric copolymer of claim 2 wherein the methacrylate chain is formed from a monomer mixture containing about 90% methyl methacrylate, 5% butyl acrylate and 5% methacrylic acid.

4. The segmented ionomeric copolymer of claim 3 wherein the ionomer forming additive is selected from a calcium salt or a magnesium salt.

5. The segmented ionomeric copolymer of claim 4 wherein the additive is calcium or magnesium acetate.

6. The segmented ionomeric copolymer of claim 5 wherein the polyolefin trunk is polypropylene.

7. A product formed from the segmented ionomeric copolymer of claims 1, 2, 3, 4, 5 or 6 and polypropylene.

* * * * *